United States Patent [19]
Yadama

[11] Patent Number: 5,554,073
[45] Date of Patent: Sep. 10, 1996

[54] FLEXIBLE SHAFT

[76] Inventor: Rathnakar Yadama, 1685 Beechwood Ave., San Leandro, Calif. 94579

[21] Appl. No.: 369,335

[22] Filed: Jan. 6, 1995

Related U.S. Application Data

[63] Continuation of Ser. No. 55,749, May 3, 1993, abandoned.

[51] Int. Cl.⁶ .................................................... F16C 1/00
[52] U.S. Cl. ............................... 464/52; 59/78; 403/220; 464/148
[58] Field of Search .............................. 464/51, 101, 106, 464/147, 148, 173, 179, 185, 52; 403/220; 59/3, 78, 82

[56] References Cited

U.S. PATENT DOCUMENTS

| | | | |
|---|---|---|---|
| 401,681 | 4/1889 | Brown | 464/148 |
| 595,708 | 12/1897 | Forsyth | 464/148 |
| 1,415,689 | 5/1922 | Parent | 464/148 |
| 1,550,683 | 8/1925 | Erikson | 59/78.1 |
| 2,153,433 | 4/1939 | Schaefer | 464/148 |
| 2,421,789 | 6/1947 | Ingham | 59/3 |
| 3,267,203 | 8/1966 | Rosenberg | 59/78 |
| 3,304,878 | 2/1967 | Sabre | 464/147 |
| 4,291,212 | 9/1981 | Bui | 464/51 |
| 4,432,874 | 2/1984 | Lundin | 464/148 |

FOREIGN PATENT DOCUMENTS

| | | | |
|---|---|---|---|
| 541929 | 8/1922 | France | 464/148 |
| 357438 | 3/1938 | Italy | 59/78 |
| 547862 | 9/1942 | United Kingdom | 59/78 |
| 861600 | 2/1961 | United Kingdom | 464/101 |

*Primary Examiner*—Daniel P. Stodola
*Assistant Examiner*—Eileen A. Dunn
*Attorney, Agent, or Firm*—Linval B. Castle

[57] ABSTRACT

A flexible shaft in which the interior rotating cable is formed of links having first and second loops formed of wires or bands that have a maximum diameter slightly less than the inside diameter of the outer non-rotating shell. The second loop of one link is linked to the first loop of the adjacent link to provide a very flexible shaft or cable with a minimum of friction.

2 Claims, 3 Drawing Sheets

FLEXIBLE SHAFT

This is a continuation of application Ser. No. 08/055,749 filed on May. 3, 1993, now abandoned.

BRIEF SUMMARY OF THE INVENTION

This invention relates to rotatable flexible shafts and particularly to a novel flexible shaft capable of driving high torque loads at high rotational speeds while the shaft is at unusual angles.

The conventional flexible shaft comprises an outer tubular shell of flexible material and an inner rotational shaft formed by wrapping successive layers of wire around a central core wire. Each layer is wound in the opposite direction and at right angles to the next underlying layer. The winding direction of the outermost layer determines the direction in which the shaft is designed to rotate and transmit its maximum torque. If rotated in the opposite direction, the outer layer and the alternate under layers tend to unwind and get loosened, resulting in a reduced torque handling capability of the shaft. If rotated in the direction for which the shaft was designed, the layers tend to tighten resulting in optimum torque handling capability of the shaft. But torque handling capacity varies according to shaft and wire diameter and as the diameter of the cable increases its flexibility decreases.

While modern materials and lubrication methods have extended the usable life of the conventional flexible shaft, little has been done, until now, to improve its flexibility. The inner rotatable shaft must contact the inside walls of the outer tubular shell; if both are of small diameter for a light torque load, they will be more flexible than a large diameter flexible shaft for driving a heavier load.

The present invention is for a flexible shaft in which the inner rotatable shaft is formed of a plurality of links, each link comprised of a pair of loops or bands coupled together at right angles. Each band has a diameter approximately equal to the inside diameter of the outer shell so that the center of each link will remain at the center of the outer shell. The area of contact between each band and the inner surface of the shell is minimized because only a very small part of the band's surface comes into contact, the result is a shaft or cable which is very flexible and which is very easily rotated in either direction of rotation, without loss of torque handling capability, irrespective of the diameter of the shaft.

BRIEF DESCRIPTION OF THE DRAWINGS

In the drawings which show a preferred embodiment of the invention

DETAILED DESCRIPTION

As previously mentioned, the flexible shaft comprises a non-rotatable outer flexible tubular shell containing an inner rotatable shaft or cable formed of a plurality of intercoupled links, each link formed of two loops coupled together at right angles and having a maximum loop diameter less than the inside diameter of the tubular shell.

Figure 1:
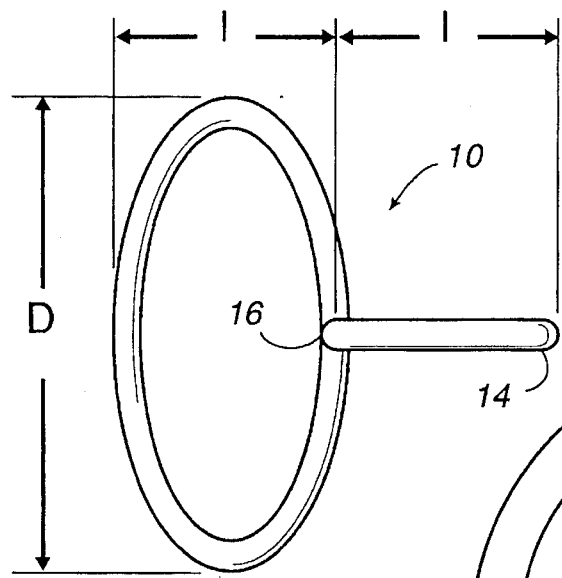
FIG. 1 illustrates a side view of a single link of the basic design for the inner rotational shaft.
Figure 2:
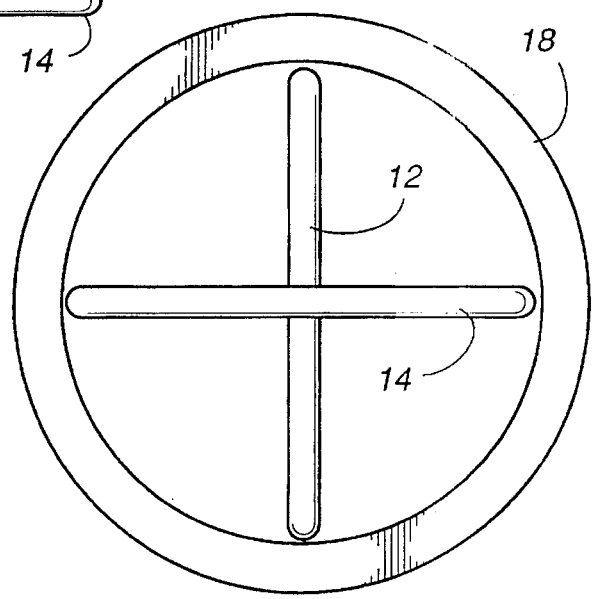
FIG. 2 is an end view of the shaft mounted in a outer shell.

FIGS. 1 and 2 illustrate a link 10 formed with a loop 12 formed on the vertical axis and a second loop 14 formed on the horizontal axis and rigidly attached to loop 12 at their equators 16. Because the loops are at right angles to each other the equator 16 of the link will remain centered in the tubular shell. The loops are curvilinear and may be circular or elliptical, as shown in FIG. 1.

For proper operation with maximum flexibility, the total length of each link should be approximately equal to, or less than, the maximum diameter of the link. Because the link 10 must be free to rotate within the outer tubular shell 18 the length of the major axis, D, must be less than the inside diameter of the shell 18 as shown in the end view of FIG. 2. In addition, the tubular shell 18 must be of a type that will not crimp or reduce its inside diameter when it is bent or flexed.

Figure 3:
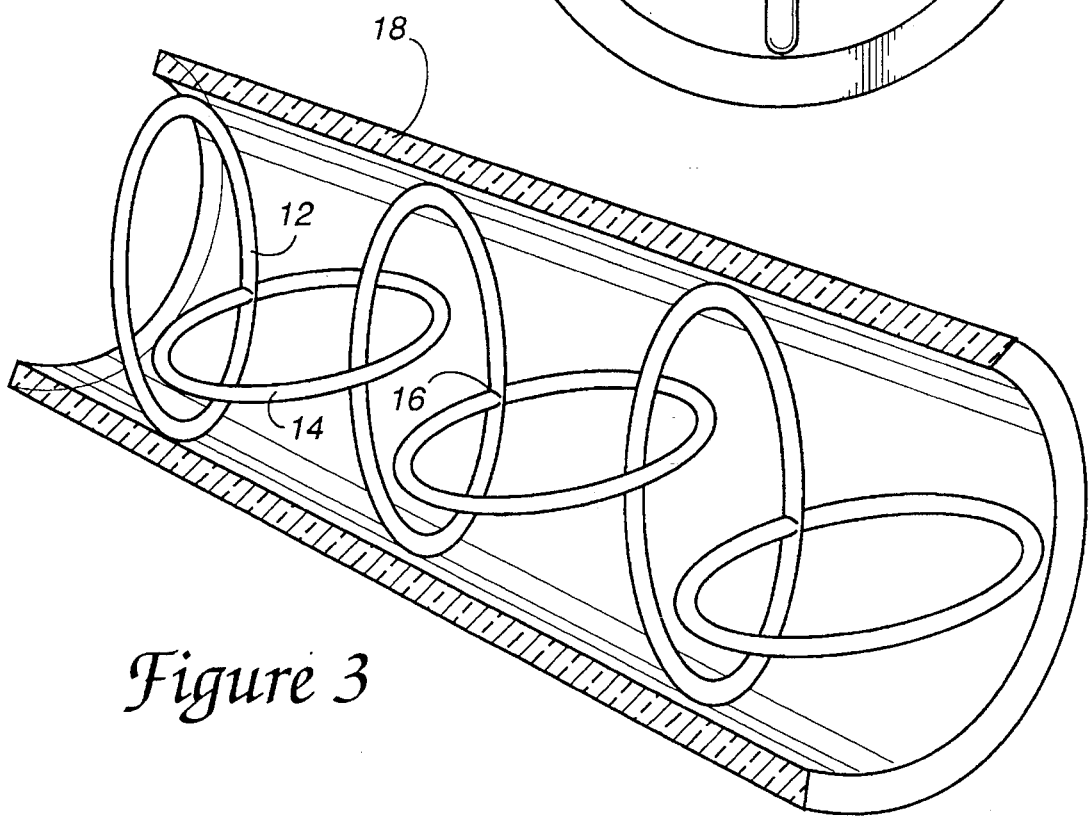
FIG. 3 is a perspective view of a section of the shaft in the outer shell.

If several links are interconnected and inserted in an outer shell, as shown in FIG. 3, a flexible shaft or cable is formed. This type of flexible shaft will be used for rotation in one direction because it will have a considerable amount of "play" in it if it is to be reversed.

Figure 4:
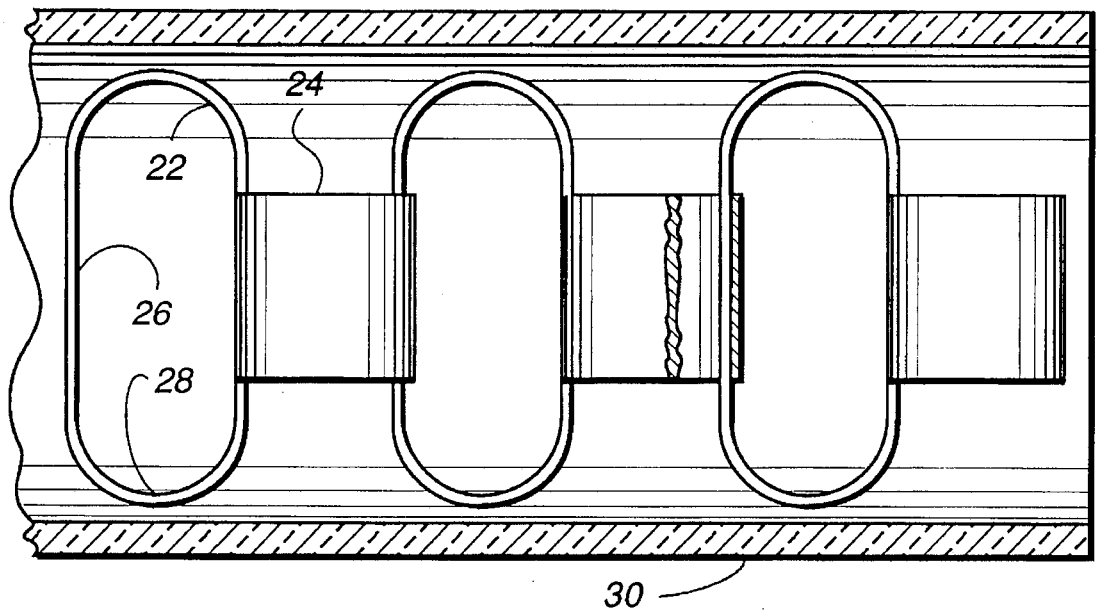
FIG. 4 is a sectional view of an alternate embodiment of the linked rotatable shaft in an outer shell.
Figure 5:
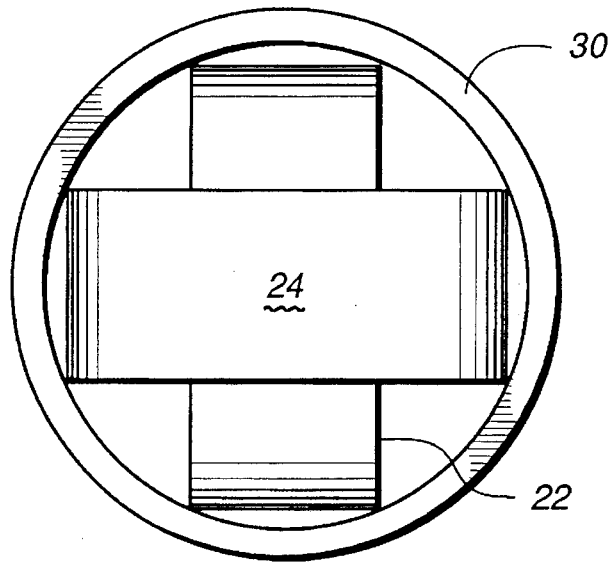
FIG. 5 is an end view thereof.

FIG. 4 illustrates three links for a rotatable shaft that has high rotational strength and less backlash or play when the rotation is reversed. Each link is curvilinear and is preferably formed of a loop 22 and an identical loop 24 coupled at right angles thereto, each loop being formed of a band or thin strap of metal having a width substantially greater than its thickness and having straight center portions 26 with the center portions connected by a curved or semicircular section 28. As with the embodiment of FIGS. 1–3, the loops 22 and 24 are interconnected and the maximum diameter of each link is slightly less than the inside diameter of the outer shell 30 for freedom to rotate.

The embodiment of FIG. 4 obtains its strength from the use of the relatively wide band material for its loops 22, 24. The width of the loops also restrict the amount of backlash or play when a flexible shaft is reversed in rotational direction. For heavy loads around sharp bends in the shaft, it may be necessary to provide the inner surfaces of the rubbing parts of the links with a suitable bearing.

Figure 6:
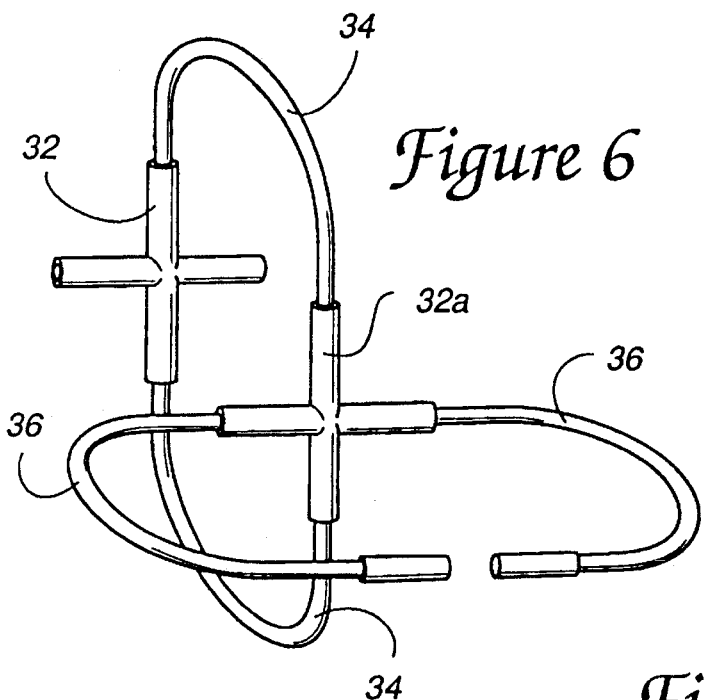
FIG. 6 is a perspective view of a single link of another embodiment of the rotatable shaft.
Figure 7:
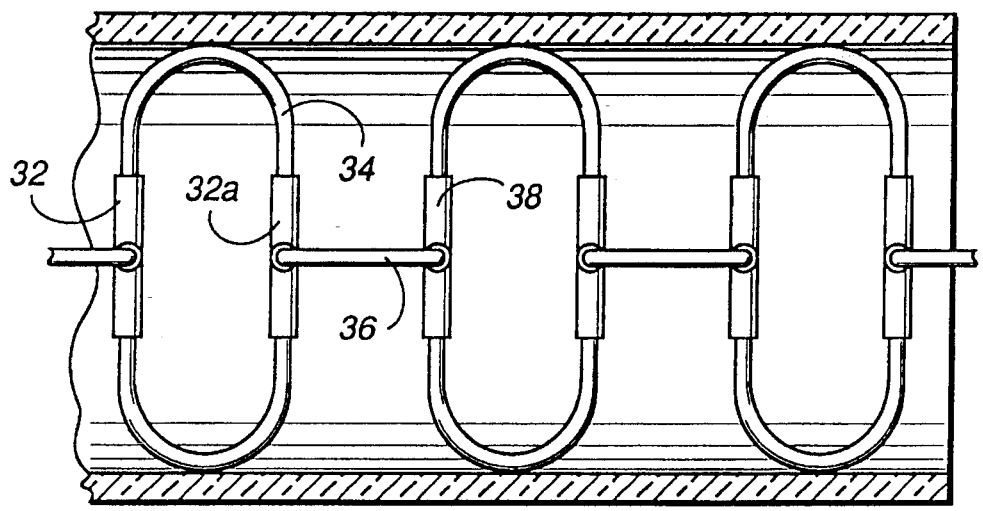
FIG. 7 is a sectional view illustrating several links in an outer shell.

FIG. 6 is a perspective illustration of one link of an alternate embodiment of the invention that is very flexible. This embodiment employs two tubular central cross members 32 at right angles to each other, with loops formed by inserting half-loops between them. Thus, as shown in the drawings, a vertical loop is formed by inserting two half-loops 34 between the vertical posts in the cross members 32 and 32a, and the horizontal loops will be formed by inserting two half-loops 36 in the horizontal posts of the cross members 32a and the first cross member 38 in the next following link, as shown in FIG. 7.

Figure 8:
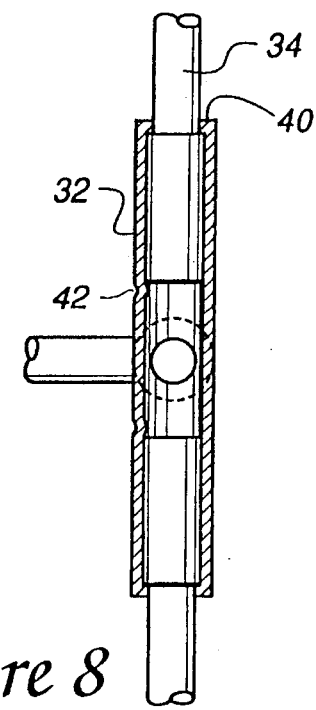
FIG. 8 is a sectional view illustrating the connections to the central cross member of FIGS. 6 and 7.

Each half-loop may freely rotate or swivel in its cross member but is restricted from longitudinal movement within its cross member. FIG. 8 illustrates one method for accomplishing this. The ends of a half-loop are enlarged in diameter so that they will fit within the tubular cross member 32. The cross member is then swaged in to loosely capture 40 the enlarged section at the end of the half-loop to prevent its removal from the link. To prevent inward movement of the half-loops small indentation 42 may be made in the tubular cross member 32.

I claim:

1. A flexible shaft comprising:

a non-rotatable tubular outer shell of flexible material;

a rotatable flexible shaft within said shell, said flexible shaft including a plurality of links, each link having a first solid loop and a second solid loop, each of said loops formed of first and second arcuate sections spanning the inside diameter of said shell, the center of said first section of said second loop being connected at a right angle to the center of the second section of said first loop, a pair of said connected loops forming said link having a length not greater than said inside diameter, the second arcuate section of said second loop coupled to the first arcuate section of the first loop in a next following link, the maximum diameter of said loops being less that the inside diameter of said tubular shell.

2. The flexible shaft claimed in claim 1 wherein said first and second solid loop on each loop on each is formed of a metal band having a width greater than its thickness.

\* \* \* \* \*